United States Patent
Rubin et al.

(10) Patent No.: US 10,307,011 B2
(45) Date of Patent: Jun. 4, 2019

(54) BREWING MODULE AND METHOD OF USING SAME

(71) Applicant: Qbo Coffee GmbH, Wallisellen (CH)

(72) Inventors: Andres Rubin, Bubikon (CH); Dominic Zwicker, Nesslau (CH); Louis Deuber, Richterswil (CH)

(73) Assignee: QBO COFFEE GMBH, Wallisellen (CH)

( * ) Notice: Subject to any disclaimer, the term of this patent is extended or adjusted under 35 U.S.C. 154(b) by 264 days.

(21) Appl. No.: 15/026,034

(22) PCT Filed: Sep. 29, 2014

(86) PCT No.: PCT/CH2014/000138
§ 371 (c)(1),
(2) Date: Mar. 30, 2016

(87) PCT Pub. No.: WO2015/048914
PCT Pub. Date: Apr. 9, 2015

(65) Prior Publication Data
US 2016/0242591 A1     Aug. 25, 2016

(30) Foreign Application Priority Data

Oct. 1, 2013   (EP) .................................. 13186920

(51) Int. Cl.
*A47J 31/36* (2006.01)
*A23F 3/18* (2006.01)
*A23F 5/26* (2006.01)

(52) U.S. Cl.
CPC ............. *A47J 31/3633* (2013.01); *A23F 3/18* (2013.01); *A23F 5/262* (2013.01); *A47J 31/3638* (2013.01)

(58) Field of Classification Search
CPC ..... A47J 31/3633; A47J 31/3638; A23F 3/18; A23F 5/262
See application file for complete search history.

(56) References Cited

U.S. PATENT DOCUMENTS 9,314,128 B2 * 4/2016 Etter ...................... A47J 31/407
2006/0130665 A1 * 6/2006 Jarisch ................ A47J 31/3638
99/279

(Continued)

FOREIGN PATENT DOCUMENTS

DE    197 18 836    11/1998
EP    2 105 074    9/2009
(Continued)

OTHER PUBLICATIONS

English translation of Chinese Office Action dated Jun. 29, 2018, Application No. 201480053670.8, 12 pages.

*Primary Examiner* — Anthony J Weier
(74) *Attorney, Agent, or Firm* — Rankin, Hill & Clark LLP

(57) ABSTRACT

A brewing module for an extraction appliance has a first brewing-module part and a second brewing-module part, which can be moved relative to the first. The first and second brewing-module parts form a discharging device for discharging an extraction product out of a capsule, containing extraction substance for the preparation of brewed beverages, and an injector for introducing an extraction liquid into the capsule. The first brewing-module part has a head with a lateral guide, which defines first and second tracks for a capsule collar. The first brewing-module part also forms a rest delimiting movement of the capsule in the downward direction when the capsule collar is located on the first track. The lateral guide is connected rigidly to the head, and the second brewing-module part has a restoring device, which (Continued)

acts on the capsule collar and moves the collar into the second track when the brewing chamber is opened.

17 Claims, 8 Drawing Sheets

(56) References Cited

U.S. PATENT DOCUMENTS

| | | | | |
|---|---|---|---|---|
| 2006/0230941 | A1* | 10/2006 | Ryser | A47J 31/3633 99/275 |
| 2009/0293236 | A1* | 12/2009 | Caveney | A44B 18/008 24/16 R |
| 2009/0308258 | A1* | 12/2009 | Boussemart | A47J 31/3633 99/295 |
| 2010/0224077 | A1* | 9/2010 | Jing | A47J 31/3633 99/295 |
| 2010/0288132 | A1* | 11/2010 | Gavillet | A47J 31/3628 99/295 |
| 2011/0011271 | A1* | 1/2011 | Kollep | A47J 31/0668 99/287 |
| 2012/0207893 | A1* | 8/2012 | Kruger | A47J 31/3633 426/431 |
| 2012/0266755 | A1* | 10/2012 | Baudet | A47J 31/3633 99/295 |
| 2013/0004637 | A1* | 1/2013 | Gugerli | A47J 31/3638 426/433 |
| 2013/0149424 | A1* | 6/2013 | Fischer | A47J 31/407 426/431 |

FOREIGN PATENT DOCUMENTS

| | | |
|---|---|---|
| EP | 2 850 980 | 3/2015 |
| JP | 2005-211659 | 8/2005 |
| JP | 2009-537269 | 10/2009 |
| JP | 2009-542280 | 12/2009 |
| JP | 2011-517551 | 6/2011 |
| WO | 2008/014830 | 2/2008 |
| WO | 2008/096385 | 8/2008 |
| WO | 2010/004376 | 1/2010 |
| WO | 2010/118543 | 10/2010 |
| WO | 2010/118544 | 10/2010 |
| WO | 2011/015978 | 2/2011 |
| WO | 2012/045184 | 4/2012 |
| WO | 2013/079813 | 6/2013 |
| WO | 2013/110206 | 8/2013 |

* cited by examiner

BREWING MODULE AND METHOD OF USING SAME

BACKGROUND OF THE INVENTION

Field of the Invention

The invention relates to extraction appliances for preparing drinks or likewise from an extraction material, for example ground coffee, which is contained in a capsule. In particular, it relates to a brewing module for an extraction appliance, as well as to an extraction appliance with such a brewing module.

Description of Related Art

Extraction appliances for preparing drinks or likewise from an extraction material which is present in a portion package amongst other things are known as coffee machines or espresso machines. In many corresponding systems, the portion packages are designed as capsules, in which the extraction material is sealed for example in an airtight manner. For extraction, the capsule is pierced, for example at two sides which are opposite to one another. An extraction fluid, generally hot water, is introduced at the first side. The extraction product is discharged from the capsule at the second side. This takes place in a so-called brewing module. Such a brewing module includes a brewing chamber, in which the capsule is received. Brewing modules, with which the capsule is inserted and the brewing chamber is closed, for example by way of an operating lever, are particularly popular, wherein the capsule is automatically removed from the brewing chamber after the brewing procedure on renewed opening of the brewing chamber, and ejected into a capsule container. Such brewing modules with an automatic capsule ejection are generally designed as horizontal brewing modules, i.e. the insertion of the capsule is effected from above, the closure of the brewing chamber is a horizontal relative movement of two brewing chamber parts, the brewing fluid flows essentially horizontally and the capsule container is arranged below the brewing chamber.

With brewing modules of this type, it should be ensured that the inserted capsule is held until the brewing chamber is closed, but that it drops downwards when the brewing chamber is opened again after the brewing process. WO 2008/014830 discloses a possible way as to how this can be accomplished for essentially beaker-like capsules with a laterally projecting collar. The brewing module, which is described there, has lateral holding arms on a brewing module part. First and second guiding grooves are formed in the holding arms. The collar is guided on both sides by the first guide grooves on insertion, wherein these first guide grooves include a limitation to the bottom, by way of which the inserted capsule is stopped. The holding arms are pivoted away to the side on closure of the brewing chamber, so that their connection to the capsule collar is completely released. The capsule is held in this condition by way of it being held in a beaker-like formation of the other brewing module part. The holding arms are pivoted back inwards on renewed opening of the brewing chamber, come into engagement with the capsule again and act as retrieval means, by way of a retrieval lug moving the capsule collar into the second guide grooves. These are open to the bottom, so that the capsule drops downward as soon as the brewing chamber is completely opened.

This solution necessitates a relatively pronounced lateral collar being present. Moreover, it is relatively intricate to realise.

EP 2 105 074 shows a brewing module with a positioning unit which likewise includes holding jaws that are connected and co-moved with the one brewing module part and are with guide grooves, by way of which the capsule collar is laterally guided on insertion. The guide grooves thereby form a guide channel, which is designed in a downwardly tapering manner and is designed in a clamping manner at the other end. On closure, the collar hits a holding edge of the other brewing part and as a result of this is bent over or creased over and thus released from the guide grooves. An undercut of the holding jaws assists the ejection of the capsule on opening the brewing chamber after the brewing procedure.

This solution too necessitates a relatively pronounced lateral collar, which must moreover be deformable in an axial direction. It is therefore not suited for all capsule types.

SUMMARY OF THE INVENTION

Departing from the state of the art, it is the object of the invention, to provide a brewing module for an extraction appliance, for example a coffee machine, for the portioned preparation of a drink or other extraction product from an extraction material packaged in a capsule, wherein this appliance is to overcome disadvantages of existing brewing modules and is to permit a simple and compact construction manner as well as a large flexibility concerning the design of the capsule. The brewing module in particular should be suitable for a horizontal installation and preferably also for high brewing pressures of a more than 10 bar, for example up to 20 bar, wherein significantly lower brewing pressures of approx. 1 bar are also not to be ruled out.

According to a first aspect, the brewing module has a first brewing module part and a second brewing module part, which is movable relative to each other, wherein the first and the second brewing module part form a discharge device for the discharge of an extraction product out of the capsule and an injector for introducing an extraction fluid into the capsule—for example the first brewing module part is the discharge device and the second brewing module part is the injector—or vice versa. A brewing chamber, which at least partly surrounds the capsule with the brewing procedure is formed in a closed position (the first and second brewing module part are "together" for example).

The second brewing module part can be movable linearly along an axial direction—i.e. in a translatory or essentially translatory manner, relative to the first brewing module part, for opening and closing the brewing chamber. A pivot movement of the brewing module parts relative to one another is not ruled out, but is generally unnecessary. In particular, in embodiments, the capsule is not actively pivoted on closing the brewing chamber. One can also envisage the capsule also not being tilted on closure, i.e. the orientation of the capsule is essentially retained on closure of the brewing chamber.

The first brewing module part includes a head with lateral (capsule) guide means. The lateral guide means are fastened on the head and are connected to the head. The lateral guide means define an essentially vertical first track (path) for a capsule collar, which can be formed for example by a weld seam or likewise. The guide means in each case in an upper region of the first track include a first restraining structure, which opposes a movement of the collar inwards out of the first track. The first brewing module part moreover forms a rest, which is formed below the track in the insert direction and prevents the capsule from dropping downwards when the capsule collar is guided along the first track. The first track can be formed for example by a first guide groove. The rest can be formed to the bottom by way of a limitation of the first guide groove—or generally of the first track.

The terms "inwards" and "outward" in this text generally relate to axial directions towards and away from the middle of the brewing chamber. Axial directions are directions along the essentially horizontal axis of the injector-discharge device, which can also correspond to a capsule axis. The terms "radially inwards" and "radially outwards" refer to radial-horizontal directions with respect to this axis. "To the top" and "to the bottom" define the respective vertical directions given a designated application of the brewing module, with which the coffee machine with the brewing module is placed on a horizontal surface.

The capsule collar for example can be a conventional, pronounced peripheral collar which projects on the plane of one of the end surfaces. However, it can also be less pronounced according to an alternative capsule shape and be designed for example as a peripheral weld edge/weld bead, as is known for example from capsules according to WO 2010/118543.

The second brewing module part includes retrieval means, which engage on the collar on opening the brewing chamber (i.e. when the first and second brewing module parts move apart), in order to move this collar into the second track by way of this opening movement.

The lateral guide means for example can be connected to the head in a fixed and stiff manner, i.e. in a relatively unmovable manner relative to this head. This can be particularly favourable with regard to manufacture and maintenance. Thereby, the lateral guide means remain laterally immovable with respect to the head, for example during the complete process. The lateral guide means for example also remain in contact with the capsule during the brewing process. On displacement out of the first track and, as the case may be, past the first track into the second track, the capsule is then slightly deformed, for example due to radial deformation. In particular, the collar, which for example is intrinsically stiff with regard to shape, can be quasi slightly pressed away radial inwards.

However, it is also possible for the lateral guide means to be deflectable (slightly) outwards counter to a spring force. A deflection of the lateral guide means can then replace that of a capsule or be supplementary to this, on displacing the capsule relative to the lateral guide means.

Supplementary or alternatively, the retrieval means can remain engaged with the capsule during the brewing process. The capsule collar during the brewing process for example can thus be located in a receiver, which is formed by the retrieval means and in which it is also co-moved during the subsequent opening of the brewing chamber, until its gets into the second track.

As is the case with the lateral guide means, the retrieval means can also not be laterally movable, but present on a housing of the second brewing module part in a fixed manner. However—it is possible for the retrieval means to be radially deflectable counter to a spring force—independently of a possible deflectability of the lateral guide means.

The guide means for example can be arranged on both sides of the capsule in a fork-like manner and each have a receiver for the capsule collar. The lateral guide means then for example each have two guide means parts, between which the retrieval means engage given a closed brewing chamber, and/or the retrieval means engage on the capsule above and below.

In an embodiment with a brewing chamber completely enclosing the capsule, an interior of a brewing chamber is defined by the enclosing elements of the first and second brewing module part—for example including a seal as the case may be. The lateral guide means and/or the retrieval means are then located in the inside of the brewing chamber—just as a capsule seal, which is present as the case may be—given a closed brewing chamber.

This approach differs from the state of the art, according to which the means with which the capsule is held in an intermediate position after insertion must be removed, for example by way of a pivot movement outwards or downwards, when closing the brewing chamber. The approach according to the invention thus permits a design with a minimum of moving parts, which is favourable with regard to reliability as well as with regard to manufacturing costs.

The capsule collar can be moved outwards out of the first track by the second brewing module part, i.e. be moved towards the head of the first brewing module part, on closure of the brewing chamber. In this brewing position, the capsule—already before the brewing process or due to the inner pressure built up in the capsule during the brewing process—is pierced by perforation elements of the first brewing module part. The capsule then on opening is pulled out of this brewing position by way of the retrieval means, until the collar has got to the second track. The capsule from there can drop down into the capsule container.

In particular, one can envisage the second track with respect to the brewing chamber being arranged further inwards, i.e. closer to the side of the second brewing module part than the first track. The capsule collar then under certain circumstances during the opening of the brewing chamber is pulled out of the brewing position past the first track into the second track.

Alternatively to this arrangement, one can also envisage the second track with respect to the brewing chamber being arranged further outwards, i.e. closer to the head of the first brewing module part than the first track. The capsule collar during the closure of the brewing chamber is then displaced out of the insert position past the second track into the brewing position.

A second restraining structure, for example, is present at the inner side of the second track which restrains, which is to say holds back, the capsule collar during the opening movement as soon as this has arrived in the second track—and this applies to both relative arrangements of the first and second track. The restraining force of this is then larger than the corresponding force of the retrieval means, so that the collar is released from the embrace of the retrieval means on further opening. This for example can be effected by way of this restraining structure projecting further radial inwards, forming a steeper angle to the axis and/or being more extended. Additionally or alternatively to this, one can also envisage the retrieval means engaging in the middle (with respect to the vertical) of the capsule collar, whereas the second restraining structure engages above and below. With an essentially cube-shaped or cuboid capsule, this means that the restraining structure engages closer to the corners and edges of the capsule, where this resists a deformation to a greater extent that the retrieval means.

The discharge device and the injector are preferably arranged lying opposite one another and for example respectively comprise an extraction-side piercing device with at least one perforation element which projects into the brewing chamber and an injection-side piercing device, likewise with at least one perforation element projecting into the brewing chamber. The perforation elements for example are designed for piercing deep-drawn plastic capsule walls, for example of polypropylene with a thickness for example of between 0.2 mm and 0.5 mm or 0.4 mm, for example between 0.25 mm and 0.35 mm, and as such, under certain circumstances, they differ from means for perforating aluminium capsules. Piercing devices for capsule wall materials other than deep-drawn plastics however can also be present.

The injector of the brewing module, in embodiments includes a capsule seal, which embraces the capsule along a peripheral lateral surface. The capsule seal in particular can include a single sealing lip which is designed in a manner projecting towards the location of the fluid injection. An onflow channel, which directs injected brewing water toward the capsule seal already before the beginning of the brewing process and permits the—seal, in particular the sealing lip, to be pressed against the lateral surface, can be present in the injector, as an option.

A capsule seal—as is described for example in WO 2012/045184—can effect the holding and positioning of the capsule in the closed-off brewing chamber. The holding of the capsule in the brewing chamber by way of a peripheral seal, amongst other things has the advantage of greater manufacturing tolerances, i.e. the elasticity of the capsule seal can accommodate inaccuracies in the relative positioning of the first and second brewing module part.

A seal can also be optionally present at the extraction side (at the side of the discharge device). According to an alternative, the sealing of the capsule however is not effected by such an additional seal, but by the sealing effect of the capsule wall pressed against a non-elastic sealing surface. The sealing surface can thereby be an arcuate or also plane surface, and the sealing effect can be assisted by way of a deformability of the capsule wall, which is hot during the brewing method.

A further optional feature relates to the mechanics for moving the second brewing module part relative to the first brewing module part (the relative movement can include a movement of the second brewing module part and/or of the first brewing module part relative to a stationary housing). According to an embodiment, an activating movement—for example of an operating lever or also of an electrical drive, in each case with or without a gearing down or gearing up—can be transmitted onto a toggle lever, wherein a toggle joint of the toggle lever is over-pressed (beyond deadcentre) on closure, i.e. in the closed condition of the brewing module it is located on a side of the plane defined by the respective outer rotation axes of the arms of the toggle lever, which is different than in the open condition of the brewing module.

Such an over-pressing—in the closed condition of the brewing module against a stop—has a self-locking effect: the brewing module parts are pressed apart due to the inner pressure rising during the brewing process, by which means the toggle lever is pressed against the stop to an even greater extent, and the brewing chamber cannot open on its own accord.

These optional features (lip seal with onflow channel; extraction-side sealing by way of a non-elastic sealing surface ; over-pressed toggle lever)—in each case per se or in combinations—interact particularly favourably with the concept described above. However per se—likewise in each case on their own or in combination—they can also be applied in other brewing modules for the extraction appliance and which include a first brewing module part and a second brewing module part, which can be moved relative to the first brewing module, wherein the first and the second brewing module part form a discharge device for the discharge of an extraction product out of a capsule with extraction material for the preparation of brewed drinks, and an injector for introducing an extraction fluid into the capsule.

According to a special embodiment, the brewing chamber, in contrast to the state of the art, for example is not designed for receiving capsules that widen conically to the discharge side or injector side, but a capsule that for example is cube-shaped or cuboid-shaped. Cuboid-shaped and cube-shaped here is to be understood as a shape that does not differ to such an extend from the geometrically exact cuboid shape and cube shape respectively, that they would be functionally different; for example the shape of a truncated pyramid with a rectangular or square base surface, wherein the side surfaces which are adjacent the base surface only enclose an small inclination angle a for example of 2° at the most, with respect to the perpendicular to the base surface, are also included. The cuboid shape or cube shape can include a peripheral collar—for example in the form of a weld edge/a weld bead—which laterally projects maximally for example by 1.5 mm and is shouldered for example to an end-surface plane.

The brewing module as already mentioned is designed as a horizontal brewing module. This however does not exclude the brewing module as a whole being able to be arranged in a slightly tilted manner. For example it can slope downward towards the first brewing module part. The inclination of the axis injector-discharge device to the horizontal is then preferably 15% at the most, in particular between 0° and 10°.

In embodiments, the brewing chamber completely encloses the capsule, i.e. the first brewing module part and the second brewing module part includes elements that correspond to one another with an accurate fit and in the closed position together form the brewing chamber. The wall parts, which are formed by the first brewing module part and the wall parts formed by the second brewing module part, can be sealed to one another in the closed position, for example by way of a peripheral closure seal. The closure seal for example can include a lip seal, which is fastened on one of the brewing module parts and abuts against a surface of the other brewing module part on closing the brewing chamber. A brewing chamber that is closed off in such a manner permits a rinsing of the extraction appliance or of the brewing module without a capsule having to be inserted—which is a significant advantage to the user. However, this does not exclude the use of a rinsing capsule or dummy capsule during the rinsing or cleaning procedure—with a closed or not fully closed brewing chamber.

The brewing chamber can be sealed off in a two-staged manner by way of such a closure seal. A first sealing stage is formed by at least one capsule seal, which embraces the capsule and prevents the introduced extraction fluid or the discharged extraction product from flowing past the capsule. The first sealing stage seals the capsule with respect to the injector or with respect to the discharge device. The closure seal seals the brewing module parts to one another as a second sealing stage. On the one hand, it can serve as a supplementary sealing during the brewing procedure. On the other hand its can serve for sealing during the rinsing procedure, as mentioned.

A method for brewing a brewed drink whilst using a capsule is additionally the subject-matter of the invention. This is carried out for example by a brewing module or an extraction appliance of the type described above and can comprise the steps:

inserting a portion capsule with an extraction material, for example through a positioning insert opening, so that a collar of the capsule is positioned on the first track, and the capsule lies on the rest;

closing the brewing chamber by way of moving the second brewing module part relative to the first brewing module part, in a manner such that the capsule is pierced at least by a perforation element of an injector, which is formed by the first and/or the second brewing module part, by way of which introduction openings arise in the capsule;

introducing an extraction fluid into the capsule through the introduction openings (for example hot water whilst using a pump and optionally a valve);

discharging the extraction fluid out of the capsule through discharge openings, which have been produced by perforation elements of a discharge device that is formed by the first and/or the second brewing module part;

subsequent to the discharge, opening the brewing chamber by way of moving the second brewing module part relative to the first brewing module part, by which means the capsule is pulled away from the first brewing module part by the retrieval elements, until the collar is positioned along the second track and continuing the opening process until the capsule drops downwards out of the opened brewing chamber.

The subject-manner of the invention is moreover an extraction appliance, in particular a drinks preparation machine, for example a coffee machine or tea machine, with a water tank or water connection, a water heater, a water pump and a brewing module of the described type, wherein the water tank, the water heater and the water pump are connected to the brewing module such that heated water delivered by the pump can be introduced through the injector into the capsule.

BRIEF DESCRIPTION OF THE DRAWINGS

Embodiment examples of the invention are hereinafter described by way of drawings. In the drawings, the same reference numerals describe the same or analogous elements. The drawings show elements which partly correspond to one another from figure to figure in different scales. There are shown in.

DETAILED DESCRIPTION OF THE INVENTION

Figure 1:
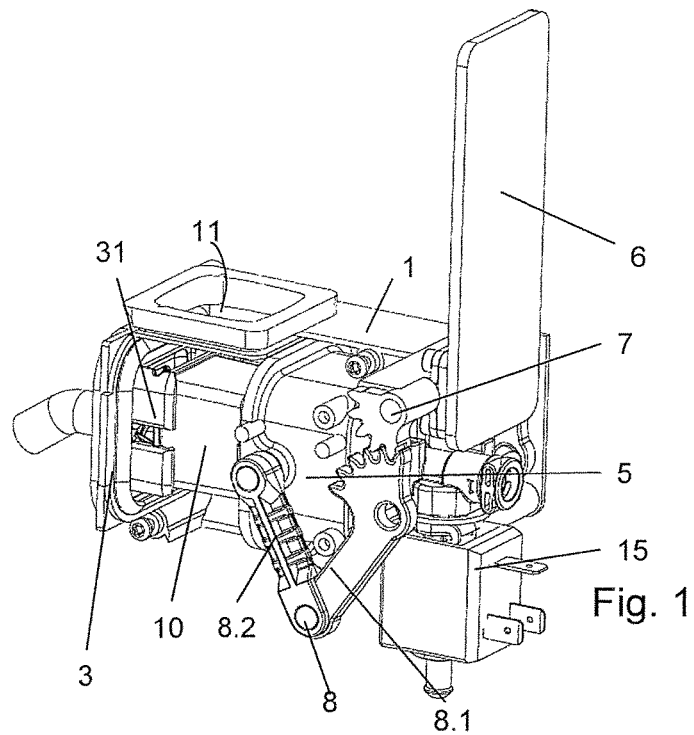
FIG. 1 is a view of a brewing module according to the invention.
Figure 2:
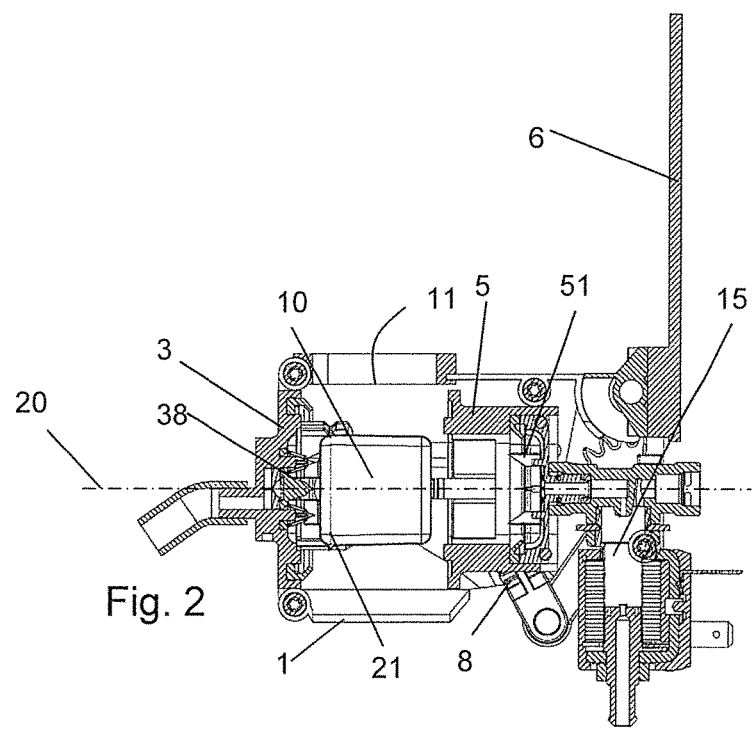
FIG. 2 is a sectioned representation of the brewing module.

The brewing module according to FIGS. 1 and 2 includes a brewing module housing 1 and, held and guided by the housing, a discharge device 3 as a first brewing module part, and an injector 5 as a second brewing module part. By way of an operating lever 6, the injector 5 can be moved relative to the housing and to the first brewing module part, between an open position, in which the brewing chamber is open and the operating lever is at the top and a closure position, in which the brewing chamber is closed and the operating lever is folded downwards. FIGS. 1 and 2 show the brewing module in the open position and with an inserted capsule 10. An insert opening 11, which also defines the orientation of the capsule on insertion, is present for the insertion of the capsule 10. The insert opening also indicates the orientation of the capsule that is to be selected, by way of indicating the position of the capsule collar 21.

Lateral guide means 31—shaped as guide jaws—are present on the discharge device, the function of which will be described in more detail hereinafter.

A toggle lever 8 is present for the conversion of the lever tilt movement (the operating lever 6 is pivotable about an axis defined by the rotation pin 7) into a translation movement of the injector 5. A closure head 9, which is fastened on the lever in a rotationally fixed manner, is meshed with one of the arms 8.1 of the toggle lever for this purpose.

Figure 3:
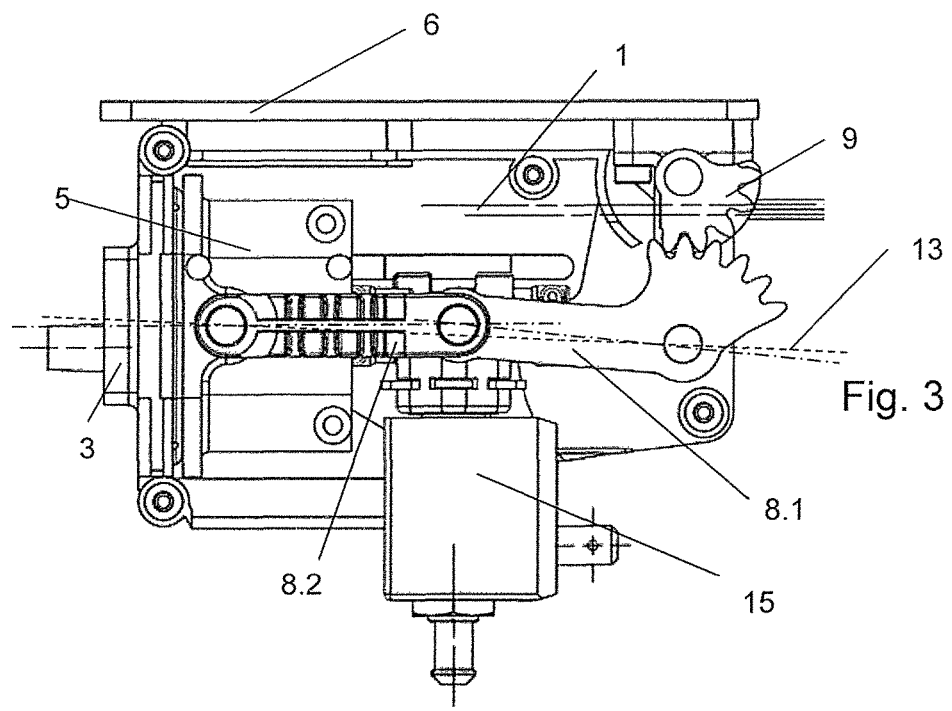
FIG. 3 is a view of parts of the closure mechanics of the brewing module.

As is particularly well visible in FIG. 3, the toggle lever is designed such that it forms a self-locking system, by way of the toggle lever being over-pressed by a few degrees in the closed condition of the brewing module when the operating lever 6 is at the stop, i.e. when the operating lever 6 is on the lower stop, the toggle lever is on the side of the plane 13 defined by the respective outer rotation axes of the arms 8.1, 8.2, which is different than in the open condition of the brewing module. For this reason, the toggle lever is pressed against a stop in the housing when pressing apart the two brewing modules during the brewing procedure, and can no longer open on its own accord.

Figure 4:
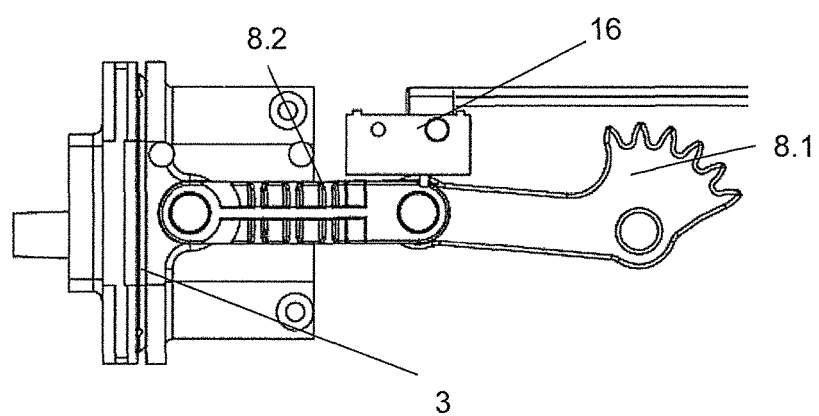
FIG. 4 is a detail of FIG. 3, which also shows a micro-switch.

A micro-switch 16 can yet be present, as is represented in FIG. 4, and this is actuated by way of the pressing of the toggle lever onto the stop, and for example can itself form the stop. The micro-switch 16 controls that certain procedures—in particular the brewing procedure itself—can only take place given a closed brewing chamber.

Alternative arrangements of such a micro-switch, in which this in each case tests the closure condition of the brewing chamber, are possible.

Figure 5:
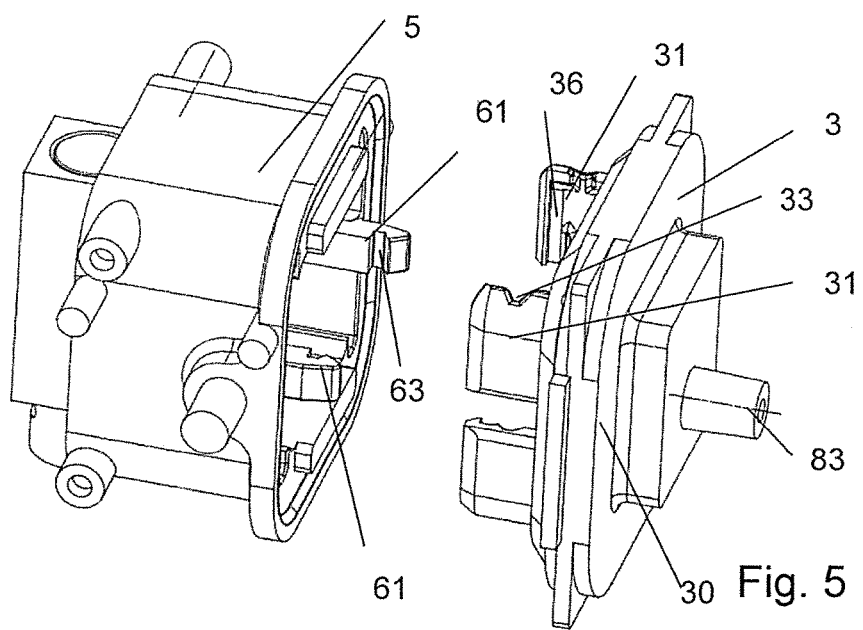
FIG. 5 is a view of the injector and of the discharge device, which is positioned relative to injector as in the opened position of the brewing chamber.
Figures 6, 7:
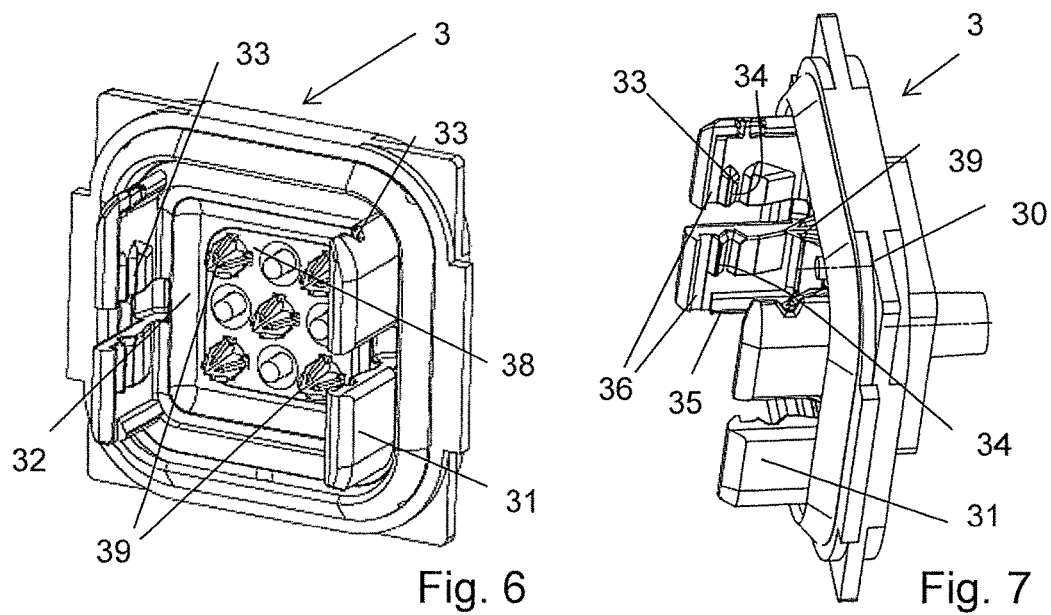
FIGS. 6 and 7 are, in each case, a further view of the discharge device.

FIG. 5 shows the injector and the discharge device—in an orientation that is different compared to the above described figures. FIGS. 6 and 7 show further views of the discharge device 3.

The lateral guide jaws 32 project from the head 30 of the discharge device 3 in the direction of the injector (i.e. inwards according to the terminology which is used here). In the represented example, they are divided in each case into an upper and a lower lateral guide jaw part with an interruption therebetween. A first, here outer track 33 and a second, here inner track 36 are defined by the lateral guide jaws 31. The outer and inner track are defined in each case by groove-like structures, which are formed for guiding the collar 21 of the capsule (the collar 21 is formed by a peripheral weld edge in the represented embodiment example), wherein the tracks are dimensioned such that the collar of the capsule still has play and is thus not pinched. The outer guide track is therefore positioned relative to the insert opening 11 such that the collar 21 of the capsule, which is inserted when the brewing chamber is open gets into the first track 33. A rest 35 on which the collar 21 and/or another portion of the capsule 10 comes to lie when this is inserted, is formed at the lower side of the first track 33. In contrast, the second track 36 is open to the bottom.

In an embodiment, which is an alternative to the represented embodiment, the two grooves can also be interchanged—i.e. the first track then lies further to the outside than the second track, which is yet described in more detail hereinafter.

In an embodiment, which is an alternative to that which is drawn, the retrieval elements 61, instead of engaging laterally between the guide jaw parts 31, can also engage from the top and bottom. In such a configuration, thus for example in FIG. 5, the inner parts of the injector, which are arranged in the inside of the brewing chamber, are rotated by 90° about the brewing chamber axis.

The manner of functioning of the holding jaws and the interaction with retrieval elements 61 of the injector 5 is dealt with in more detail by way of FIGS. 8 to 12.

Figure 8:
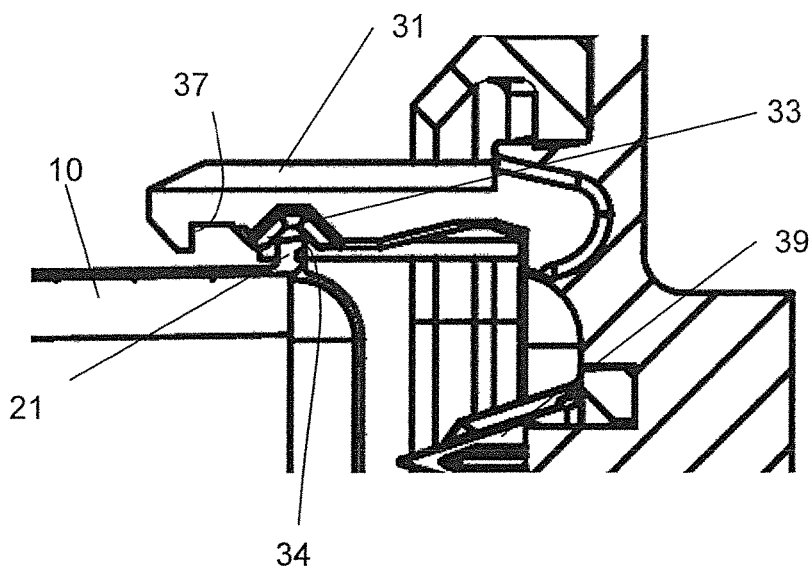
FIG. 8 is a sectioned representation of the capsule and parts of the discharge device, after the insertion of the capsule and before the closure of the brewing chamber—represented sectioned along a horizontal plane below the capsule middle.
Figure 9:
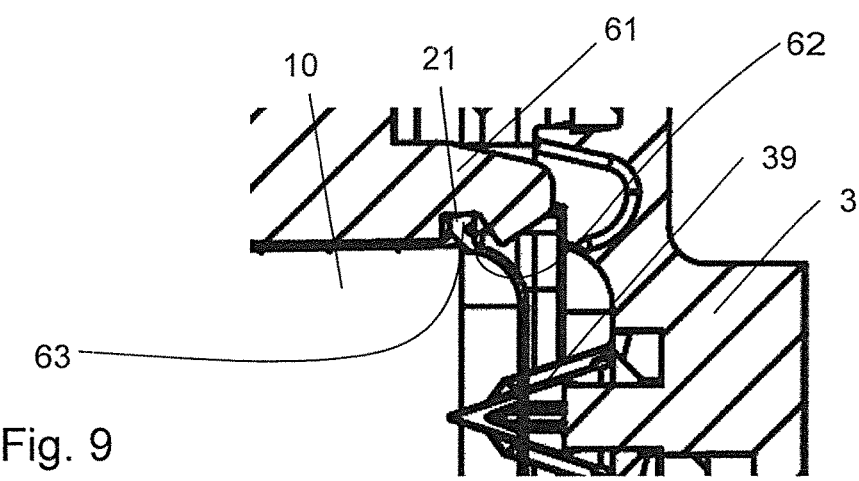
FIG. 9 is a sectioned representation of parts of the capsule, the discharge device and the injector during the closure of the brewing chamber—represented sectioned along a horizontal plane in capsule middle.
Figure 10:
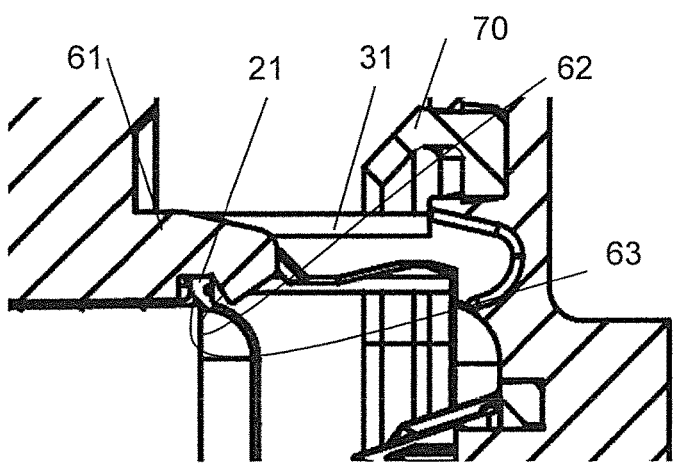
FIGS. 10, 11 and 12 are, in each case, a representation of the arrangement analogous to FIG. 9, represented during different stages of the opening of the brewing chamber.

FIG. 8 shows a sectioned representation of the condition after the insertion of the capsule. The collar 21 is located in the outer track. The outer restraining structure at the upper side supports the collar and prevents the capsule from tilting away downwards and to the inside, i.e. to the left in the drawn orientation. The injector is moved towards the discharge device on closure of the brewing chamber, and the retrieval element slides into the interruption between the upper and the lower guide jaw parts. The capsule—guided by a capsule seal, which is yet described in more detail hereinafter—is caught, which is to say is driven along a certain distance and is already pierced somewhat, for example, by way of extraction-side perforation elements (extraction pins 39) (FIG. 9).

The brewing process subsequently takes place, in which process hot water is introduced under pressure into the capsule, and the extraction product is discharged at the extraction side. A piercing device 38 as is the subject-matter of the European patent application 13 185 359.0 can be used for the discharge for example. Other piercing and discharge devices can also be applied, for example according to WO 2010/118544.

A catch portion 62 of the retrieval element 61 engages on the capsule collar 21 on opening the brewing chamber and thus pulls the capsule away from the extraction pins 39. The retrieval element also pulls the capsule collar past the outer track (FIG. 10) due to the fact that the retrieval element in the region of the catch portion 62 projects further radially inwards than the first (outer) restraining structure 34. Thereby, the capsule as a whole is slightly deformed, so that the collar—which is generally comparatively stiff with regard to its shape—can yield slightly radially outwards. This can be encouraged by way of the capsule still being generally hot after the brewing process and the capsule material being able to be more easily deformed than at room temperature. The principle however also functions with capsules which have cooled down.

A second (inner) restraining structure 37 is shaped out at the inner side of the second track 36. This projects radially inwards further than the first restraining structure 34 and/or is formed at a steeper angle to the axis 20 and/or is extended to a greater extent and/or is arranged further to the top/ further to the bottom than the first restraining structure 34, so that the restraining effect (the force which would need to be mustered, in order to pull the capsule past this with force) is larger than that of the first restraining structure 34.

Figure 11:
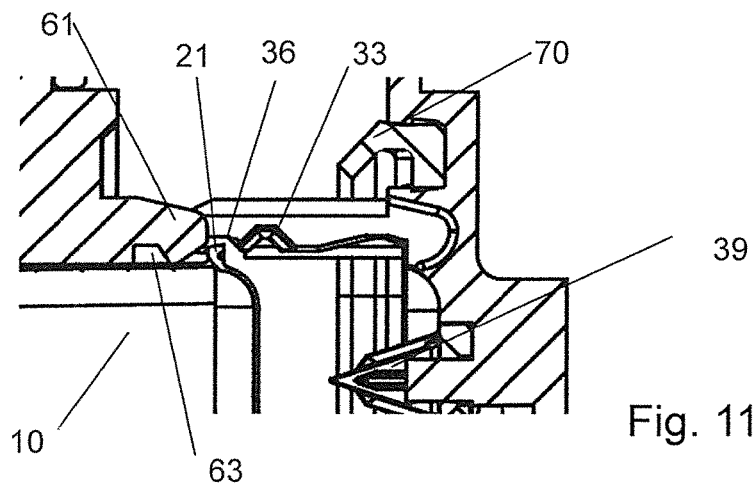
Figure 12:
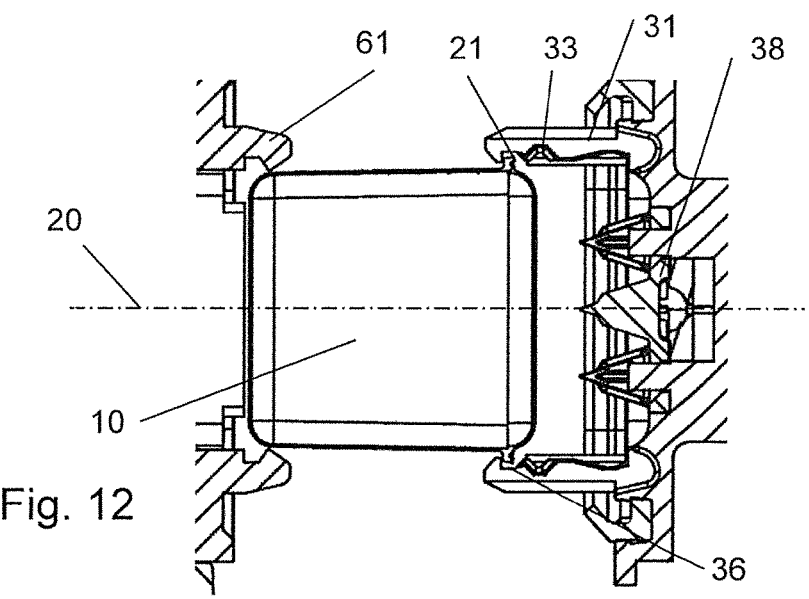

The restraining effect of the second restraining structure 37 is also larger than that (acting in the reverse direction) of the catch portion 62. In the represented embodiment example, this mainly arises due to the fact that the catch portion engages on the middle part of the capsule, and the second restraining structure 37 in contrast engages above and below this and closer to the corners of the capsule. Since these resist a deformation of the capsule as a whole more that the middle part of the capsule, the later yields inwards and thus permits a slipping-away of the catch portion 62 (FIG. 11).

After the capsule restrained by the second restraining structure 37 has been completely released from the receiver formed by the injector (FIG. 12), it can drop downwards into a capsule container.

It is not necessary for the first track 33 to be defined by groove-like structures, as in the illustrated example. In contrast, under certain circumstances it is sufficient if, on the upper side, a first restraining structure 34 is present, which supports the collar 21 form the inner side and thus prevents the capsule which stands on the rest from slipping away inwards. As an alternative or supplementary to this, the inner track can merely be defined by restraining structures of the type of the second restraining structure 37.

Figure 13:
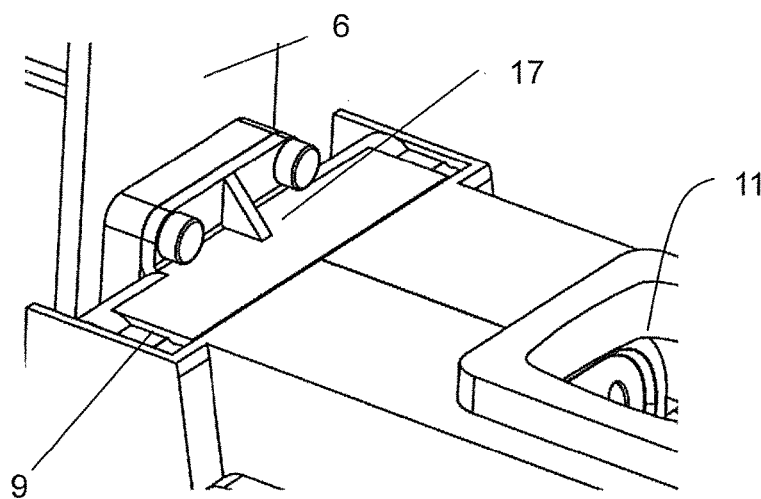
FIG. 13 is a detail of the brewing module with an opened brewing chamber.

A detail of the closure head 9 is illustrated in FIG. 13. This forms a cover 17 that participates in the pivot movement of the lever and by way of which a user is prevented from engaging into the mechanics of the brewing unit, and the danger of injury is minimised by way of this.

During the brewing process, the capsule is embraced by a capsule seal of the injector which also holds this capsule in a positioning manner. This capsule seal can be shaped as described in WO 2012/045184, and this publication is expressly referred to.

Figure 14:
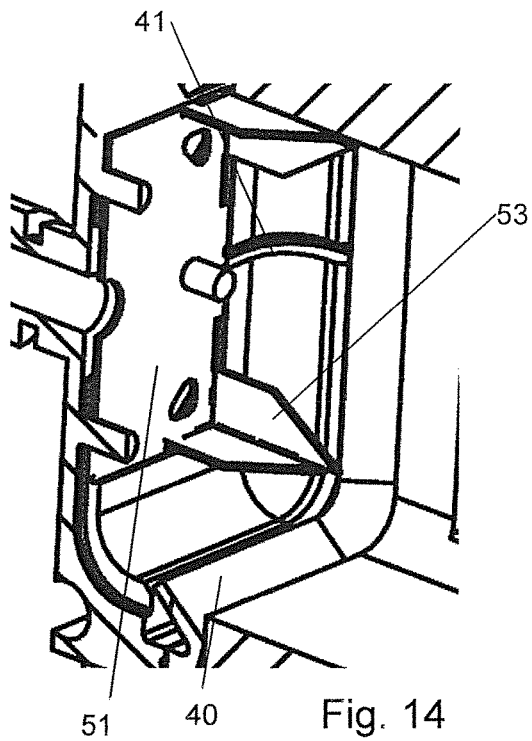
FIG. 14 is a sectioned representation of a detail of the injector.

FIG. 14 shows the brewing module with a capsule seal 40 which with the implementation of the principle according to WO 2012/045184 is designed as a simple lip seal that is designed in a manner projecting towards the location of the fluid injection, so that the fluid pressure of the fluid, which is admitted from the injection side, additionally presses the sealing lip against the capsule.

The injector 5 has an injection-side piercing device 51 with a plurality of perforation elements 53.

A special optional feature of the injector 5 is likewise visible in FIG. 14. Thereby, it is the case of an onflow channel 41, which encourages a fluid flow towards the capsule seal 40, even if the capsule is pressed against the injector. The capsule seal is subjected to onflow by way of this measure, already before the water has penetrated into the capsule—thus before the brewing process.

A sealing of the capsule 10 with respect to the discharge device here optionally functions without a separate extraction-side seal. Such a sealing is necessary, so that the brewed drink exiting from the capsule gets into the pour-out and cannot drop downwards past the capsule. In the embodiment example described here, according to a special aspect of the invention, a sealing surface 32, is matched to the capsule shape is present on the extraction side, against which sealing surface the capsule is pressed in an extensive manner during the extraction process. Thereby, this sealing surface can be manufactured of a hard material, for example injection-moulded hard plastic or metal, wherein it is the capsule wall, which is more deformable during the brewing process and which is sealingly pressed against the sealing surface 32.

A further optional feature of the injector 5 can be seen for example in FIGS. 1-3. A 3/2-way valve is fastened with the help of a geometry which is integrally injected directly on the injector—i.e. the valve 15 is present directly on the injector and for example is not connected to this injector via a hose or likewise, as is known from the state of the art. The 3/2-way valve includes a pump-side connection (entry), an injection-side connection (exit) and a drip water connection (alternative exit). The 3/2-way valve as is known per se serves for the relief of the brewing space. In the non-actuated condition, the brewing chamber is relieved by way of a path from the injection-side connection to the drip water connection being open. In the actuated condition, the path from the entry to the injection-side connection is free and the drip water connection is blocked. After completion of the brewing procedure, the valve goes into the non-actuated condition again and permits the pressure relief out of the injection-side connection by way of the water dripping into a drip pan. The pump-side connection is thereby blocked, which also prevents post-vaporisation due to a sudden pressure drop after the brewing procedure.

Figure 15:
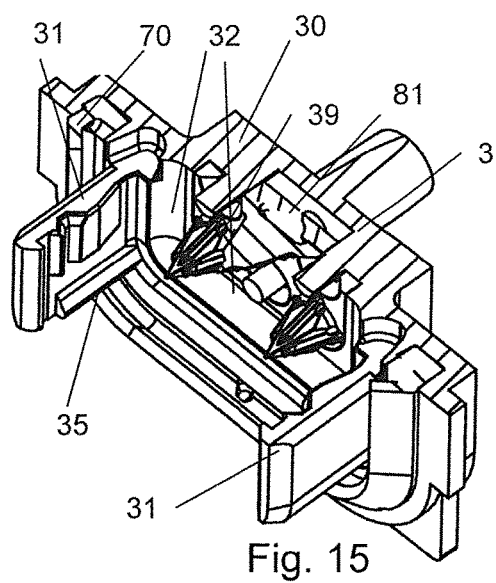
FIGS. 15 and 16 are, in each case, a sectioned representation of the discharge device.

FIG. 15 shows a sectioned representation of the discharge device. Apart from the elements that have already been described above, one can see a closure seal 70, which here as is the case with the capsule seal 40, is designed as a lip seal. This in the closed condition of the brewing chamber bears on the housing of the injector 5 and is pressed against this brewing chamber when subjected to pressure. This seals the brewing chamber and prevents the exit of water even if no brewing capsule is inserted—for example for a rinsing procedure.

Likewise visible in FIG. 15 is a flexible nozzle 81, which is arranged behind the extraction-side piercing device 38. This for example can consist of silicone or another food-grade and elastic material and can include a nozzle opening for example of between 0.15 mm and 0.4 mm, in particular between 0.2 mm and 0.3 mm.

Such a nozzle amongst other things has the effect that the brewed drink is additionally foamed, so that the formation of the poplar "crema" is encouraged.

Figure 16:
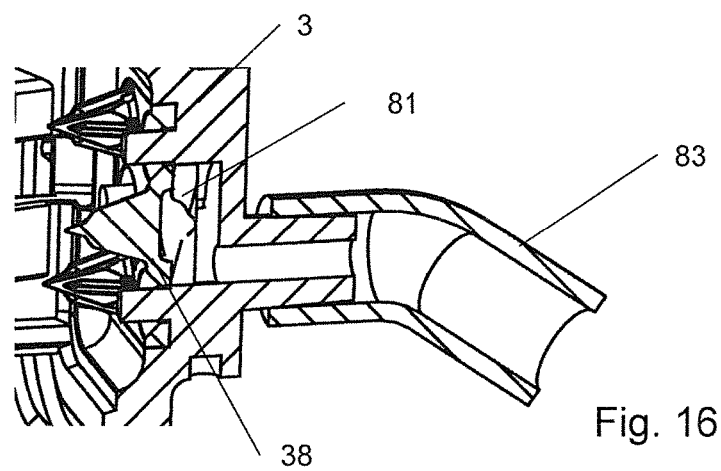
Figure 17:
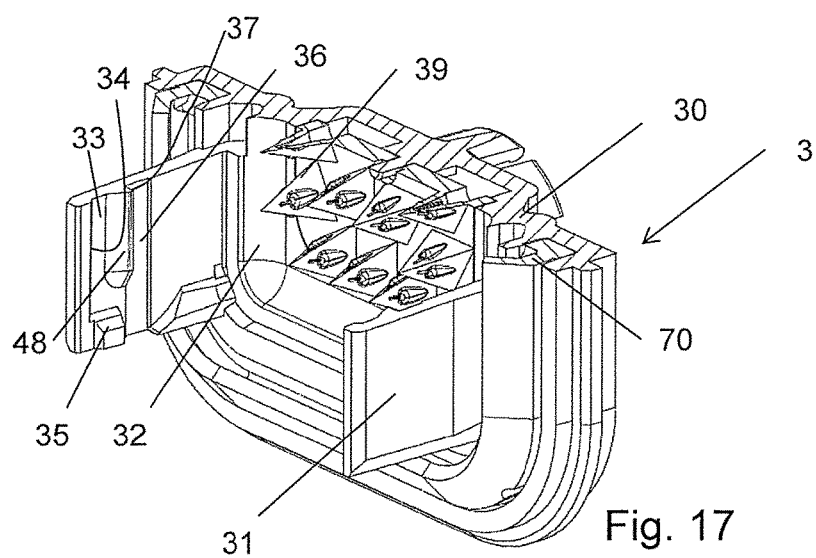
FIG. 17 is a view of an alternatively discharge device, which is sectioned along a horizontal plane.
Figure 18:
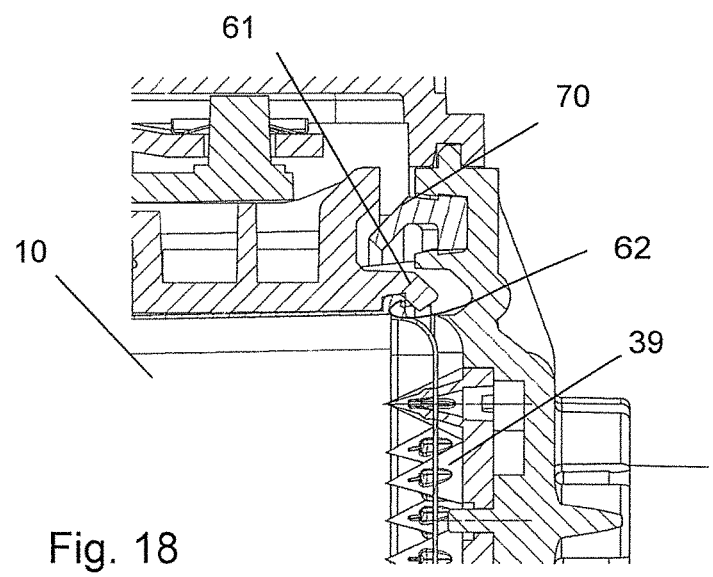
FIGS. 18, 19, and 20 are, in each case, a sectioned representation of the discharge device, of parts of the capsule, of the discharge device and of the injector, during different stages of the opening of the brewing chamber.

FIG. 16 likewise shows parts of the discharge device 3 in a sectioned representation, in which apart from the nozzle 81, the pour-out 83 for the brewed drink is also visible. In FIG. 18, one can also see an optional form of the flexible nozzle 81. This at the inlet side includes a region that tapers towards the nozzle opening and channels the flow of fluid.

The discharge device 3 according to FIGS. 17-20 differs from those of the preceding figures in that the first track 33 is arranged at the inside and the second track 36 at the outside. Accordingly, the arrangements of the first restraining structure 34 and of the second restraining structure 37 are interchanged. The prominence (rib) which the second, here outer restraining structure 37 forms, has a comparatively shallow ramp 48 at the inner side towards the first track 33.

The capsule inserted into the brewing module, as in the previously described embodiment is held in a guided manner by the first track 33 and lies on the rest. On closure of the brewing chamber, the capsule collar is displaced away out of the first track via the ramp 48 and past the second track outwards towards the head 30. The retrieval elements 61 of the injector remain engaged with the capsule during the brewing process even with this embodiment.

Figure 19:
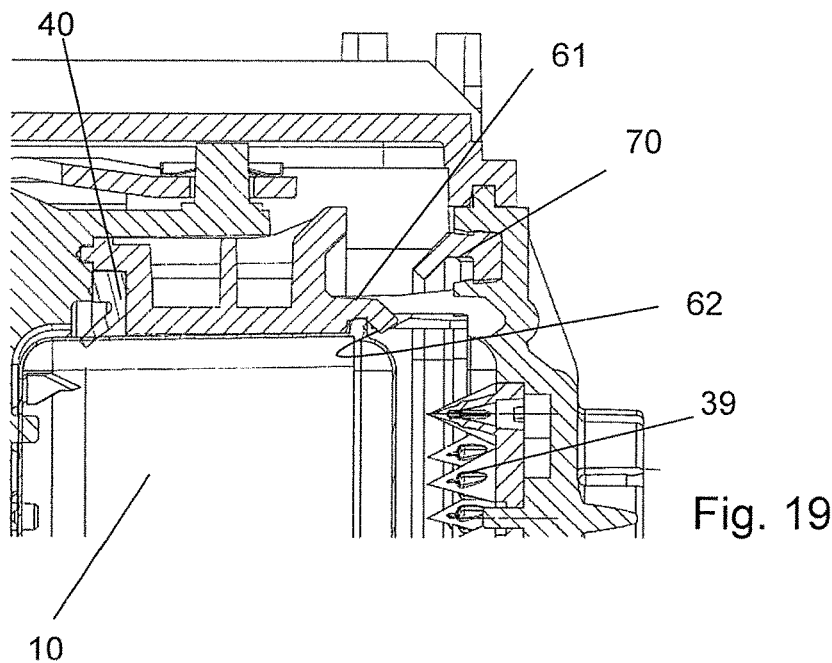
Figure 20:
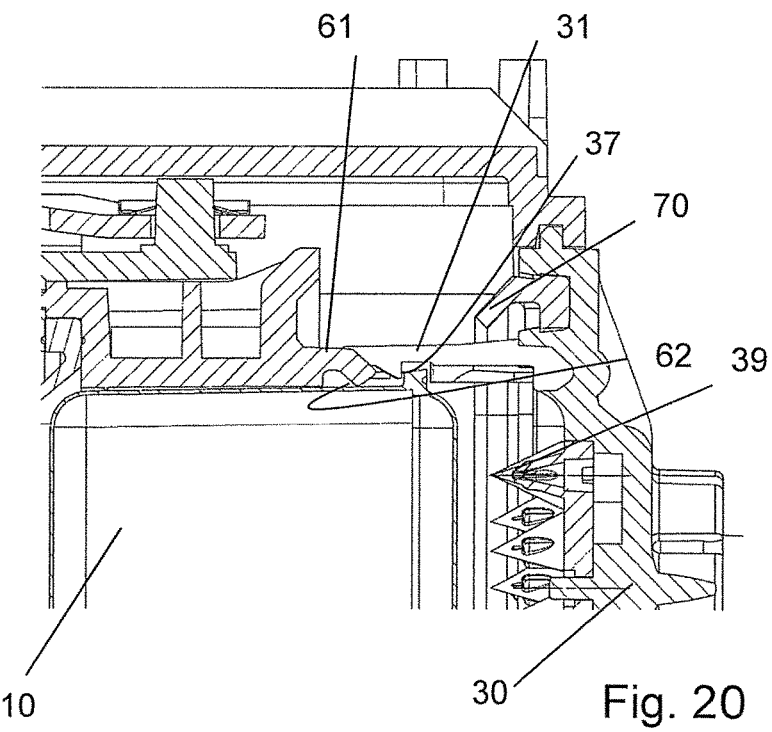

On opening the brewing chamber after the brewing process, the catch portion 62 of the respective retrieval element will engage on the capsules collar (FIG. 18) and thus pull the capsule away from the extraction pins 39 on opening (FIG. 19). The second retraining structure 37 is designed such the restraining effect is larger than that of the catch portion 62, so that the capsule collar remains stuck there, when the injector is moved further away (FIG. 20), so that the capsule collar remains stuck in the second track 36 and can drop downwards.

The invention claimed is:

1. A brewing module for an extraction appliance, comprising a first brewing module part and a second brewing module part, said first and second brewing module parts being movable relative to one another and cooperating to define a brewing chamber, wherein one of the first and second brewing module parts forms a discharge device to discharge an extraction product out of a capsule with extraction material for preparation of brewed drinks, and the other one of the first and second brewing module parts forms an injector for introducing an extraction fluid into the capsule, wherein the first brewing module part comprises a head with a lateral guide that defines a first track for a capsule collar and a second track for the capsule collar, said first track being spaced a distance from said second track, wherein the first brewing module part also forms a rest that is aligned with the first track and limits a downwards movement of the capsule when the capsule collar is disposed in the first track, wherein the lateral guide is connected to the head, and wherein the second brewing module part comprises a retrieval device that is designed to engage the capsule collar, the retrieval device comprising a catch portion designed to engage on the capsule collar to pull the capsule collar away from the first brewing module part into the second track during opening of the brewing chamber.

2. The brewing module according to claim 1, wherein the lateral guide is disposed within the brewing chamber when the brewing chamber is closed.

3. The brewing module according to claim 1, wherein the lateral guide is in contact with the capsule when the brewing chamber is closed.

4. The brewing module according to claim 1, wherein the retrieval device is engaged with the capsule when the brewing chamber is closed.

5. The brewing module according to claim 1, wherein the lateral guide is rigidly connected to the head.

6. The brewing module according to claim 1, wherein the retrieval device is rigidly connected to a housing of the second brewing module part.

7. The brewing module according to claim 1, wherein a second restraining structure is arranged adjacent to the second track, the second restraining structure being equipped to restrain the capsule, the collar of which is engaged by the retrieval device, in the second track.

8. The brewing module according to claim 1, wherein the second track, with respect to the brewing chamber, is arranged further inwards than the first track.

9. The brewing module according to claim 7, wherein the second track, with respect to the brewing chamber, is arranged further to the outside than the first track, and that the second restraining structure is formed by a prominence that is arranged between the first track and the second track, wherein the prominence, towards the first track, forms a ramp that is shallower than the second restraining structure.

10. The brewing module according to claim 1, wherein the lateral guide on each side of the capsule comprises two guide parts, and the retrieval device extends between the guide parts when the brewing chamber is closed.

11. The brewing module according to claim 1, wherein the injector comprises a capsule seal that embraces the capsule along a peripheral lateral surface.

12. The brewing module according to claim 11, wherein the capsule seal comprises a single sealing lip that is designed projecting towards a location of the fluid injection.

13. The brewing module according to claim 11, further comprising an onflow channel in the injector, said onflow channel guiding injected brewing water towards the capsule seal before the beginning of the brewing process and permitting the seal to be pressed against the lateral surface.

14. The brewing module according to claim 1, further comprising mechanics for converting an activating movement into a movement of the second brewing module part relative to the first brewing module part, wherein these mechanics comprise a toggle lever with two toggle lever arms, each toggle lever arm comprising an outer rotation axis and the toggle lever arms comprising a common toggle joint, wherein the outer rotation axes of the two toggle lever arms define an outer axes plane, wherein when the brewing chamber is closed, the toggle joint is located on a first side of the outer axes plane, and when the brewing chamber is open, the toggle joint is located on a second side of the outer axes plane, the second side being different from the first side.

15. An extraction appliance, comprising a water tank or water connection, a water heater, a water pump and a brewing module according to claim 1, wherein the water tank, the water heater and the water pump are connected to the brewing module such that heated water, which is delivered by the pump, can be introduced through the injector into the capsule.

16. A method for brewing a brewed drink while using a capsule filled with an extraction material, and a brewing module according to claim 1, comprising the steps of:
inserting a portion capsule through an insert opening so that a collar of the capsule is positioned on the first track, and so that the capsule lies on the rest;
closing the brewing chamber by way of moving the second brewing module part relative to the first brewing module part such that the capsule is pierced at least by a perforation element of an injector, which is formed by the first and/or the second brewing module part, by which introduction openings are formed in the capsule;
introducing an extraction fluid into the capsule through the introduction openings;
discharging an extraction fluid, which has arisen in the capsule, out of the capsule through discharge openings, which have been produced by perforation elements of a discharge device that is formed by the first and/or the second brewing module part;
subsequent to the discharge of the extraction fluid, opening the brewing chamber by moving the second brewing module part relative to the first brewing module part and thereby pulling the capsule away from the first brewing module part by the catch portion, until the collar is positioned along the second track, and further opening the brewing chamber until the capsule drops downwards out of the opened brewing chamber.

17. The brewing module according to claim 1, wherein the retrieval device is designed to engage the capsule collar and move the capsule collar out of the first track and into the second track during opening of the brewing chamber.

* * * * *